United States Patent
Ohnishi et al.

(10) Patent No.: US 12,174,051 B2
(45) Date of Patent: Dec. 24, 2024

(54) ELECTRODE EMBEDDED CERAMIC STRUCTURE

(71) Applicant: NGK Insulators, Ltd., Nagoya (JP)

(72) Inventors: Takao Ohnishi, Niwa-Gun (JP); Daishi Tanabe, Kasugai (JP); Akifumi Morishita, Komaki (JP)

(73) Assignee: NGK INSULATORS, LTD., Nagoya (JP)

( * ) Notice: Subject to any disclaimer, the term of this patent is extended or adjusted under 35 U.S.C. 154(b) by 322 days.

(21) Appl. No.: 17/656,464

(22) Filed: Mar. 25, 2022

(65) Prior Publication Data
US 2022/0214205 A1    Jul. 7, 2022

Related U.S. Application Data

(63) Continuation of application No. PCT/JP2020/036887, filed on Sep. 29, 2020.

(30) Foreign Application Priority Data

Oct. 4, 2019    (JP) .................................. 2019-183510

(51) Int. Cl.
*G01F 23/263* (2022.01)
*C04B 37/02* (2006.01)

(52) U.S. Cl.
CPC .......... *G01F 23/268* (2013.01); *C04B 37/025* (2013.01); *G01F 23/266* (2013.01)

(58) Field of Classification Search
None
See application file for complete search history.

(56) References Cited

U.S. PATENT DOCUMENTS

| | | | |
|---|---|---|---|
| 2005/0095732 A1 | 5/2005 | Maebashi et al. | |
| 2010/0294300 A1 | 11/2010 | Takenouchi | |
| 2013/0217562 A1* | 8/2013 | Yamauchi | ............... C04B 35/49 501/86 |

(Continued)

FOREIGN PATENT DOCUMENTS

| | | | |
|---|---|---|---|
| JP | 10208969 A | * | 8/1998 |
| JP | 2001-351763 A | | 12/2001 |

(Continued)

OTHER PUBLICATIONS

JP 1020869 (Year: 1998).*

(Continued)

*Primary Examiner* — Patrick Assouad
*Assistant Examiner* — Mark A Shabman
(74) *Attorney, Agent, or Firm* — BURR PATENT LAW, PLLC

(57) ABSTRACT

An electrode embedded ceramic structure includes: a first ceramic layer; an electrode layer formed on the first ceramic layer; and a second ceramic layer covering the first ceramic layer and the electrode layer, the second ceramic layer being thinner than the first ceramic layer. In a cross section of the first ceramic layer, the electrode layer, and the second ceramic layer along a laminating direction in this electrode embedded ceramic structure, T1 and T2 satisfy Equation (T2−T1)/T2≤0.15, where T1 denotes a least thickness in the second ceramic layer, and T2 denotes an average thickness of the second ceramic layer.

7 Claims, 14 Drawing Sheets

(56) References Cited

U.S. PATENT DOCUMENTS

2014/0355176 A1* 12/2014 Lee .................. H01G 4/30
           361/306.3
2015/0028881 A1  1/2015 Matsushita

FOREIGN PATENT DOCUMENTS

| | | |
|---|---|---|
| JP | 2004-241148 A | 8/2004 |
| JP | 2005-123578 A | 5/2005 |
| JP | 2005-135716 A | 5/2005 |
| JP | 2006-179741 A | 7/2006 |
| JP | 2009-088113 A | 4/2009 |
| JP | 2016-212010 A | 12/2016 |
| WO | 2009/057595 A1 | 5/2009 |
| WO | 2013/073207 A1 | 5/2013 |

OTHER PUBLICATIONS

Translation of JP 1020869 (Year: 1998).*
Japanese Office Action (Application No. 2021-551306) dated Jul. 25, 2023 (with English translation) (10 pages).
International Search Report and Written Opinion (Application No. PCT/JP2020/036887) dated Dec. 8, 2020 (with English translation).
English translation of the International Preliminary Report on Patentability (Chapter I) dated Apr. 14, 2022 (Application No. PCT/JP2020/036887).

\* cited by examiner

F I G. 1 0
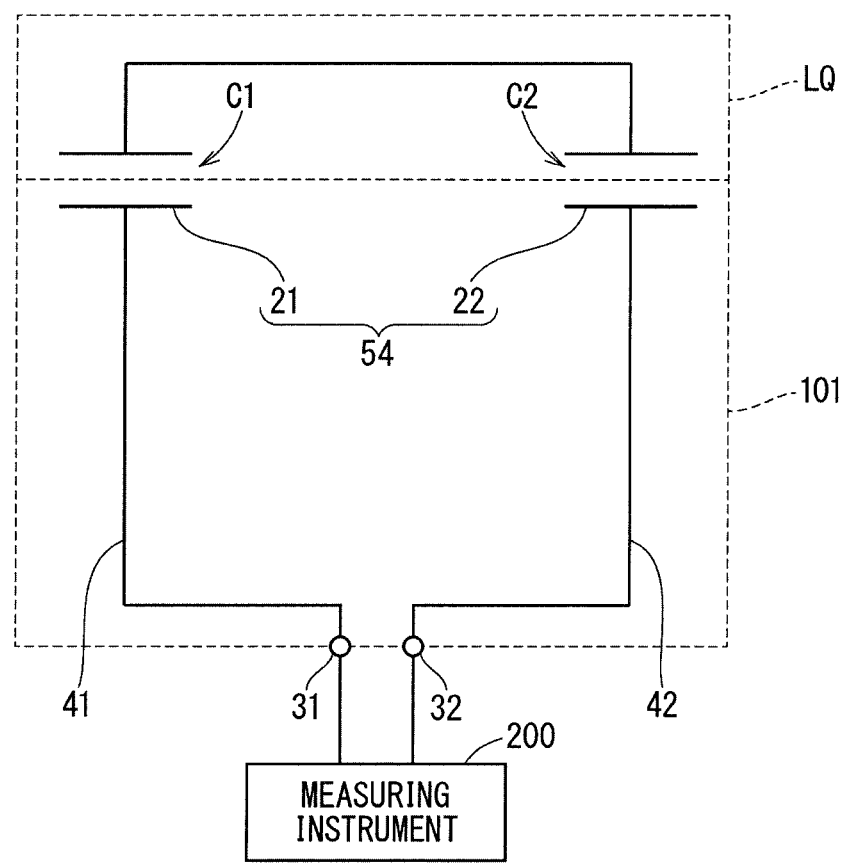

ELECTRODE EMBEDDED CERAMIC STRUCTURE

BACKGROUND OF THE INVENTION

Field of the Invention

This specification discloses a technology on an electrode embedded ceramic structure.

Description of the Background Art

Ceramic structures in each of which an electrode is embedded are known. Such ceramic structures are available as devices such as heaters, sensors, piezoelectric elements, and discharge devices. Japanese Patent Application Laid-Open No. 2005-135716 discloses a discharge device using the ceramic structure. In the ceramic structure of above-mentioned Japanese Patent Application Laid-Open No. 2005-135716, an electrode layer (a discharge electrode) is printed on the surface of the first ceramic layer (a ceramic sheet). The second ceramic layer (a protective layer) is formed on the surface of the first ceramic layer to cover the first ceramic layer and the electrode layer. In above-mentioned Japanese Patent Application Laid-Open No. 2005-135716, the second ceramic layer has a surface roughness Ra less than or equal to 10 μm. This increases the durability (life) of the discharge device. Also in above-mentioned Japanese Patent Application Laid-Open No. 2005-135716, the second ceramic layer is 10 μm thick or more. The surface of the second ceramic layer is covered with, for example, a non-crystallizing glass or a polyimide.

SUMMARY

In the ceramic structure in which the electrode is embedded (electrode embedded ceramic structure), the second ceramic layer functions as an insulating layer or a heat insulation layer. Thus, the second ceramic layer is preferably thinned to obtain better characteristics in a device including the electrode embedded ceramic structure. However, the thinner the second ceramic layer is, the more the durability (life) of the device decreases. As described above, the second ceramic layer is 10 μm thick or more in above-mentioned Japanese Patent Application Laid-Open No. 2005-135716. This prevents a decrease in the durability (life) of the device. Thus, the conventional electrode embedded ceramic structures have a trade-off relationship between the characteristics and the durability. In the conventional design concept, it is difficult to make the characteristics and the durability of the electrode embedded ceramic structure compatible. Thus, it is desired to develop an electrode embedded ceramic structure based on a new design concept. The object of this disclosure is to provide a new electrode embedded ceramic structure based on the new design concept different from the conventional design concept.

An electrode embedded ceramic structure may include: a first ceramic layer, an electrode layer formed on the first ceramic layer; and a second ceramic layer covering the first ceramic layer and the electrode layer, the second ceramic layer being thinner than the first ceramic layer. In a cross section of the first ceramic layer, the electrode layer, and the second ceramic layer along a laminating direction in this electrode embedded ceramic structure, T1 and T2 may satisfy Equation (1) below, where T1 denotes a least thickness in the second ceramic layer, and T2 denotes an average thickness of the second ceramic layer:

$$(T2 - T1)/T2 \leq 0.15. \tag{1}$$

BRIEF DESCRIPTION OF DRAWINGS

FIG. 10 is a circuit diagram illustrating an approximate equivalent circuit corresponding to FIG. 9.

DESCRIPTION OF THE PREFERRED EMBODIMENTS

Embodiment 1

Figure 1:
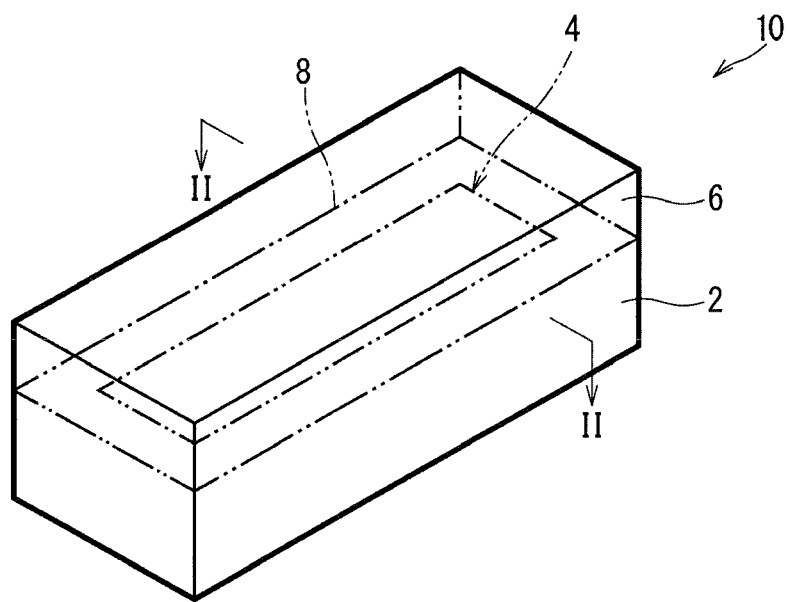
FIG. 1 illustrates a schematic view (perspective view) of an electrode embedded ceramic structure according to Embodiment 1.

An electrode embedded ceramic structure disclosed in this specification may include: a first ceramic layer; an electrode layer formed on the first ceramic layer, and a second ceramic layer covering the first ceramic layer and the electrode layer. Example materials of the first and second ceramic layers may include zirconia ($ZrO_2$), partially stabilized zirconia, and stabilized zirconia. The stabilized or partially stabilized zirconia is a material to which yttria ($Y_2O_3$) or calcia (CaO) has been added as a stabilizer. The first and second ceramic layers may be made of the same material or different materials. The first and second ceramic layers are preferably made of the same material so that they are well sintered each other. The second ceramic layer may be thinner than the first ceramic layer. The thickness of the second ceramic layer is not particularly limited, but may range from 1 μm to 10 μm. The second ceramic layer may be 8 μm thick or less, 5 μm thick or less, or 3 μm thick or less. The second ceramic layer may be 2 μm thick or more, 4 μm thick or more, or 6 μm thick or more. The second ceramic layer may be regarded as a protective layer of an electrode (an electrode layer).

The second ceramic layer preferably has a uniform thickness without any locally thinner portion or any locally thicker portion. Specifically, in a cross section of the first ceramic layer, the electrode layer, and the second ceramic layer along a laminating direction, a least thickness (T1) and an average thickness (T2) of the second ceramic layer may satisfy a relationship of Equation (1) below:

$$(T2 - T1)/T2 \leq 0.15. \quad (1)$$

Equation (1) above indicates that a difference between the average thickness T2 and the least thickness T1 of the second ceramic layer is less than or equal to 15% of the average thickness T2. The difference between the average thickness T2 and the least thickness T1 of the second ceramic layer (T2−T1) may be less than or equal to 12%, 8%, 5%, or 3% of the average thickness T2.

In the electrode embedded ceramic structure, the thinner the second ceramic layer is, the better the characteristics become. On the other hand, the thinner the second ceramic layer is, the more the durability decreases. The least thickness portion influences the durability of the electrode embedded ceramic structure (the second ceramic layer) the most. In other words, the second ceramic layer deteriorates from the least thickness portion as a starting point. Thus, the second ceramic layer is conventionally thickened so that the least thickness portion ensures a certain thickness. As a result, the average thickness of the second ceramic layer is unavoidably thickened; this limits the improvements in the characteristics. Here, adjusting the thickness of the second ceramic layer so that Equation (1) above is satisfied can improve the durability of the second ceramic layer (electrode embedded ceramic structure), without increasing the average thickness of the second ceramic layer (without any degradation in the characteristics). The thicknesses of the second ceramic layer (T1, T2) are determined as follows. First, images of the second ceramic layer (for example, 100 μm long) are captured, so that the least thickness T1 is measured. The average thickness T2 can be calculated from the thicknesses of, for example, arbitrary 100 locations.

A percentage of voids in the second ceramic layer may be less than or equal to 0.05%. When the second ceramic layer has the voids, the thickness of the matrix (ceramics) in a portion with the void is reduced by the void. When the percentage of the voids in the second ceramic layer is less than or equal to 0.05%, the matrix can avoid having a locally thinned portion, and a decrease in the durability can be more reliably prevented. The percentage of the voids in the second ceramic layer can be calculated by, for example, subjecting SEM images of the second ceramic layer to image processing by iTEM analysis software (manufactured by SEIKA CORPORATION).

The electrode layer may be formed on a part of the surface of the first ceramic layer. Specifically, the electrode layer may be surrounded by the first ceramic layer on the surface of the first ceramic layer. In other words, the electrode layer may be formed in a portion other than the periphery (a center portion) on the surface of the first ceramic layer. A plurality of electrode layers may be formed on the surface of the first ceramic layer. As described above, the second ceramic layer covers the first ceramic layer and the electrode layer. Thus, a laminated structure of the first ceramic layer, the electrode layer, and the second ceramic layer is formed in the portion with the electrode on the first ceramic layer. On the other hand, the first ceramic layer and the second ceramic layer are in contact with each other in a portion without the electrode on the first ceramic layer. Specifically, the first ceramic layer and the second ceramic layer are sintered and integrated with each other.

In the portion where the first ceramic layer, the electrode layer, and the second ceramic layer are laminated, an interface between the electrode layer and each of the ceramic layers need not be flat. In other words, the front surface and the back surface of the electrode layer (contact surfaces with the first ceramic layer and the second ceramic layer) need not be flat. Specifically, in the cross section of the first ceramic layer, the electrode layer, and the second ceramic layer along the laminating direction, a length of the electrode layer on the first ceramic layer (L1), a length of the electrode layer on the second ceramic layer (L2), and a length of the electrode layer in a direction orthogonal to the laminating direction (L3) may satisfy a relationship of Equation (2) below:

$$(L1 + L2)/L3 \geq 2.2. \quad (2)$$

In the definition, the length L3 is a linear length along the direction orthogonal to the laminating direction. Furthermore, the length L1 is a length along the interface between the electrode layer and the first ceramic layer. The length L2 is a length along the interface between the electrode layer and the second ceramic layer.

Equation (2) above indicates that the sum of the lengths on the front and back surfaces of the electrode layer is 10% larger than or equal to the sum of the lengths when the front and back surfaces of the electrode layer are flat. In other words, Equation (2) above indicates that the front and back surfaces of the electrode layer are rough. The roughness on the front and back surfaces of the electrode layer enables the electrode layer and the ceramic layers to interpenetrate each other. This can produce the anchor effect of firmly bonding the electrode layer and the ceramic layers together. In short, delamination of the electrode layer from the ceramic layers can be prevented. When F1 is defined as F1=(L1+L2)/L3 in Equation (2) above, F1 may be larger than or equal to 2.4, 2.6, 2.8, or 3.0.

The length L1 may be larger than the length L2. In other words, roughness of the electrode layer on the first ceramic layer may be larger than that on the second ceramic layer. Variations in thickness of the second ceramic layer (the layer thinner than the first ceramic layer) can be reduced while the delamination of the electrode layer from the ceramic layers is prevented. The length L1 may be 1.1 times, 1.2 times, 1.3 times, or 1.4 times larger than or equal to the length L2. The lengths of the front surface and the back surface of the electrode layer (the lengths L1 and L2) can be calculated, for example, from SEM images of the electrode layer using the aforementioned iTEM analysis software.

The electrode layer may be made of, for example, platinum (Pt) or an Au—Pt alloy containing gold (Au). Furthermore, the electrode layer may contain ceramic particles. A coefficient of thermal expansion of the electrode layer containing ceramic particles can approach those of ceramic layers (the first and second ceramic layers) more than that of an electrode layer made of a metal. In addition, it is expected as an advantage that sintering the ceramic particles in the electrode layer with the ceramic layers facilitates formation of the roughness on the surface of the electrode. A percentage of ceramic particles in the electrode layer may be higher than or equal to 4%. The percentage of ceramic particles in the electrode layer may be higher than or equal to 5%, 7%, or 10%. The higher the percentage of ceramic particles is, the more easily the advantages can be produced. The percentage of ceramic particles in the electrode layer may be lower than or equal to 50%, 30%, or 20%. When the percentage of ceramic particles in the electrode layer is lower than or equal to 50%, the electrode layer can sufficiently exercise the functions as an electrode.

The percentage of ceramic particles in the electrode layer may be calculated, for example, from areas of the metal and the ceramic particles in the electrode layer, by capturing SEM images of the cross section of the first ceramic layer, the electrode layer, and the second ceramic layer along the laminating direction. The areas of the metal and the ceramic particles in the electrode layer can be calculated, for example, using the aforementioned iTEM analysis software.

Example materials of the ceramic particles may include zirconia ($ZrO_2$), partially stabilized zirconia, and stabilized zirconia. The stabilized or partially stabilized zirconia is a material to which yttria ($Y_2O_3$) or calcium oxide (CaO) has been added as a stabilizer. In other words, the ceramic particles may be made of a material identical to that of the first and second ceramic layers. Furthermore, the ceramic particles may be made of a metal oxide different from that of the first and second ceramic layers. Examples of the metal oxide include alumina ($Al_2O_3$), spinel ($MgAl_2O_4$), titania ($TiO_2$), zirconia ($ZrO_2$), magnesia (MgO), mullite ($Al_6O_{13}Si_2$), and cordierite ($MgO$—$Al_2O_3$—$SiO_2$).

EXAMPLE

An example electrode embedded ceramic structure will be described with reference to FIGS. 1 to 4. FIG. 1 illustrates a ceramic structure 10 in which a Pt electrode 4 is embedded. The ceramic structure 10 includes a substrate 2 made of zirconia, the Pt electrode 4 formed on the surface of the substrate 2, and a protective layer 6 made of zirconia and covering the substrate 2 and the Pt electrode 4. The substrate 2 is an example of the first ceramic layer. The Pt electrode 4 is an example of the electrode layer. The protective layer 6 is an example of the second ceramic layer.

Figure 2:
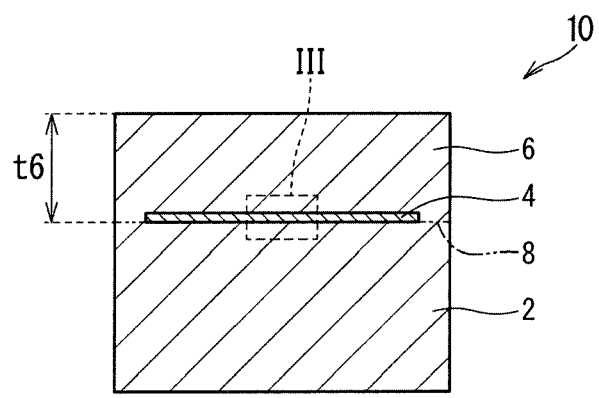
FIG. 2 illustrates a cross section taken along the line II-II in FIG. 1.

As illustrated in FIGS. 1 and 2, the Pt electrode 4 is disposed in a center portion of the surface of the substrate 2. Thus, all the surfaces of the Pt electrode 4 are surrounded by the ceramic layers (the substrate 2 and the protective layer 6), and the Pt electrode 4 is not exposed outside of the ceramic structure 10. A laminated structure of the substrate 2, the Pt electrode 4, and the protective layer 6 is formed in the portion with the Pt electrode 4. Besides, the substrate 2 and the protective layer 6 are bonded together in a portion without the Pt electrode 4. FIGS. 1 and 2 illustrate a bonded surface 8 between the substrate 2 and the protective layer 6, using virtual lines. Since the substrate 2 and the protective layer 6 are actually sintered, the substrate 2 and the protective layer 6 have no clear boundary on the bonded surface 8. Thus, when the shapes and the sizes of the substrate 2 and the protective layer 6 are described, the shapes and the sizes in a portion of the laminated structure of the substrate 2, the Pt electrode 4, and the protective layer 6 will be described. In the ceramic structure 10, the substrate 2 is 1 mm thick, the Pt electrode 4 is 3 µm thick, and the protective layer 6 is 3 µm thick (a thickness t6 in FIG. 2) on average.

The ceramic structure 10 was fabricated as follows: preparing the substrate 2 on the surface of which a Pt paste was screen printed; preparing the protective layer 6 by a sheet forming method separately from the substrate 2; disposing the protective layer 6 on the surface of the substrate 2; and pressure laminating/firing the substrate 2 and the protective layer 6. Specifically, a PT paste containing, by volume, 25% zirconia particles with an average grain diameter of 0.5 µm was screen printed on a certain place of a surface of a zirconia substrate of 1 mm. This consequently produced the substrate 2 on the surface of which the Pt electrode 4 was formed. The conditions for screen printing were adjusted so that the fired protective layer 6 was 3 µm thick. Furthermore, the protective layer 6 was fabricated by preparing zirconia slurry containing zirconia particles, molding the zirconia slurry into a zirconia sheet of 3 µm in a die coater method, and drying the zirconia sheet. Then, the ceramic structure 10 was obtained by pressure laminating the zirconia sheet on the surface of the substrate 2 and firing the zirconia sheet at 1500° C. in the atmosphere.

Figure 3:
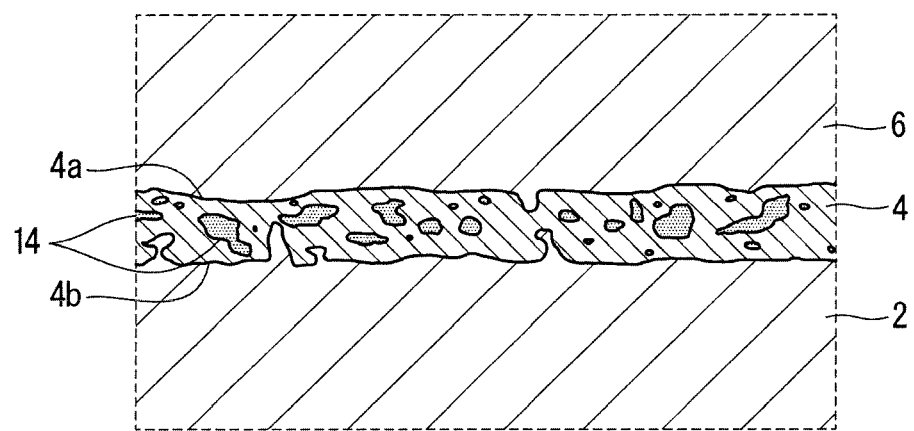
FIG. 3 illustrates an enlarged view of the area enclosed by the broken line in FIG. 2.

FIG. 3 illustrates an enlarged view (a view magnified 3,000 times) of a portion of the laminated structure of the substrate 2, the Pt electrode 4, and the protective layer 6. As illustrated in FIG. 3, zirconia particles 14 were observed inside the Pt electrode 4. The existence of the scattered zirconia particles 14 in the Pt electrode 4 was observed. From the result of calculating a percentage (an area ratio) of the zirconia particles 14 in the Pt electrode 4 using the iTEM analysis software, we confirmed the existence of 5% zirconia particles 14 in the Pt electrode 4.

Furthermore, the roughness was observed on a front surface 4a (a surface facing the protective layer 6) and a back surface 4b (a surface facing the substrate 2) of the Pt electrode 4. The length of the front surface 4a was 1.03 times larger and the length of the back surface 4b was 1.21 times larger than that of the Pt electrode 4 (the Pt electrode 4 in the image (FIG. 3) in the horizontal direction). The sum of the lengths of the Pt electrode 4 on the front and back surfaces was 2.24 times larger than the length of the Pt electrode 4. In other words, an average length of the Pt electrode 4 on the front and back surfaces was 12% (1.12 times) larger than the length of the Pt electrode 4. Furthermore, the length of the back surface 4b was larger than that of the front surface 4a, and was 1.17 times larger than that of the front surface 4a. The lengths of the front surface 4a and the back surface 4b were calculated using the iTEM analysis software.

Figure 4:
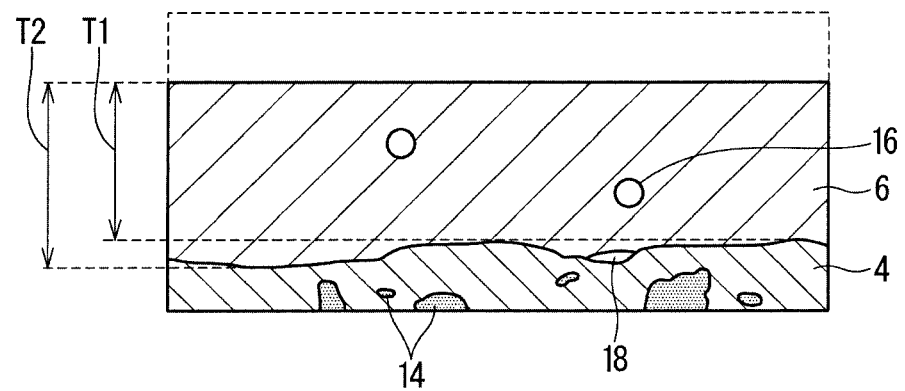
FIG. 4 illustrates an enlarged view (a cross section) of the second ceramic layer.

FIG. 4 illustrates an enlarged view (a view magnified 3,000 times) from a bonded portion between the Pt electrode 4 and the protective layer 6 to the surface of the protective layer 6. As illustrated in FIG. 4, we confirmed that the bonded surface between the substrate 4 and the protective layer 6 was not flat and the thickness of the protective layer 6 varied. A plurality of images of the protective layer 6 (approximately 100 m long) were captured for measuring the thickness of the protective layer 6. Then, the least thickness T1 was measured. Furthermore, thicknesses of arbitrary 100 locations were measured, and the average thickness T2 of the protective layer 6 was calculated. As a result, the least thickness T1 was 2.6 µm, and the average thickness T2 was 3.0 µm. In other words, a difference between the least thickness T1 and the average thickness T2 was 13% of the average thickness T2.

Furthermore, a percentage of voids in the protective layer 6 was calculated using the iTEM analysis software. In calculating a percentage of voids in the protective layer 6, an void 16 enclosed by a matrix of the protective layer 6 is regarded as an void in the protective layer 6, and an void 18 observed between the protective layer 6 and the Pt electrode 4 is not regarded as an void in the protective layer 6 (see FIG. 4). A plurality of images of the protective layer 6 (approximately 100 µm long) were captured, and an average value of the percentages of voids in a plurality of locations was calculated. The result confirmed the existence of 0.05% of voids in the protective layer 6.

[Withstand Voltage Test]

We evaluated the characteristics (durability) of the ceramic structure 10. Specifically, a surface electrode was formed on the surface of the protective layer 6 (a surface opposite to the surface with the Pt electrode 4), test voltages were applied between the surface electrode and the Pt electrode 4, and whether dielectric breakdown occurred was confirmed (a withstand voltage test). The test voltages were 10 V, 20 V, 30 V, and 40 V. After the test voltages were applied for 30 minutes, the ceramic structure 10 in which dielectric breakdown did not occur was classified as acceptable, and the ceramic structure 10 in which dielectric breakdown has occurred within 30 minutes was classified as a failure. We also evaluated, as comparative examples, samples having the protective layers whose average thickness was equal to that of the ceramic structure 10 (3.0 μm) and whose variations in thickness were wider than those of the ceramic structure 10 (a difference between the average thickness and the least thickness of the protective layers was 22% of the average thickness). Each of the samples of the comparative examples was fabricated by screen printing a zirconia paste (a material of the protective layers) on the surface of a substrate on which a Pt electrode was formed. In the samples of the comparative examples, a percentage of voids in the protective layers was 0.7%.

As a result of the withstand voltage test, dielectric breakdown has occurred at 20 V in the samples of the comparative examples. In contrast, no dielectric breakdown was observed in the ceramic structure 10 even with application of a voltage of 40 V for 30 minutes. Since variations in thickness of the ceramic structure 10 are narrower (a difference between the average thickness T2 and the least thickness T1 is 13% of the average thickness T2), high durability of the ceramic structure 10 was confirmed.

[Thermal Shock Test]

Next, samples (Samples 1) each with the Pt electrode 4 and the protective layer 6 whose thicknesses are different from those of the ceramic structure 10 were fabricated. Then, we evaluated the characteristics of the Pt electrodes 4 (the presence or absence of delamination of the Pt electrodes 4 from the substrates 2). Specifically, Samples 1 whose average thickness of the Pt electrodes 4 was changed to 10 μm and whose average thickness of the protective layers 6 was changed to 5 μm were fabricated. Then, a test (thermal shock test) was conducted on Samples 1 by repeatedly changing a voltage applied to the Pt electrodes 4 of Samples 1, and performing a process of increasing the temperature to 600° C. for 15 seconds and cooling the temperature to 100° C. for 15 seconds as one cycle. To prevent the thickness of the protective layers 6 from influencing the test results, the Pt electrodes 4 and the protective layers 6 of Samples 1 were made thicker than those of the ceramic structure 10 in the thermal shock test. Moreover, ceramic structures without containing ceramic particles (zirconia particles) in the Pt electrodes (the average thickness of the Pt electrodes was 10 μm and the average thickness of the protective layers was 5 μm) were fabricated as comparative examples, and were also evaluated (Samples 2). In each of the ceramic structures of the comparative examples (Samples 2), the front surface and the back surface of the Pt electrode were almost flat. The sum of the lengths of the front surface and the back surface of the Pt electrode was 2.04 times larger than the length of the Pt electrode. In other words, an average length of the front surface and the back surface of the Pt electrode in each of the ceramic structures of Samples 2 was 2% larger than the length of the Pt electrode.

As a result of the thermal shock test, the Pt electrodes were delaminated from the substrates in the 20-th cycle in the ceramic structures of Samples 2. In contrast, no delamination of the Pt electrodes 4 from the substrates 2 was observed in Samples 1 even after a test with 100 cycles. Large roughness was formed on the front surface and the back surface of the Pt electrode 4 in the ceramic structure 10 (the sum of the lengths of the front surface and the back surface was 2.2 times larger than or equal to the length of the Pt electrode). Thus, we confirmed that the Pt electrode 4 was firmly bonded to the substrate 2 and the protective layer 6 and that the delamination was prevented (high durability was obtained).

The electrode embedded ceramic structure containing ceramic particles in the electrode layer is described in the Examples. However, the technology disclosed in this specification is applicable to an electrode embedded ceramic structure excluding ceramic particles in the electrode layer. What is important is to adjust a difference between the average thickness and the least thickness of the protective layer (the second ceramic layer) covering the substrate and the electrode layer to less than or equal to 15% of the average thickness.

Embodiment 2

[Structure]

Figure 5:
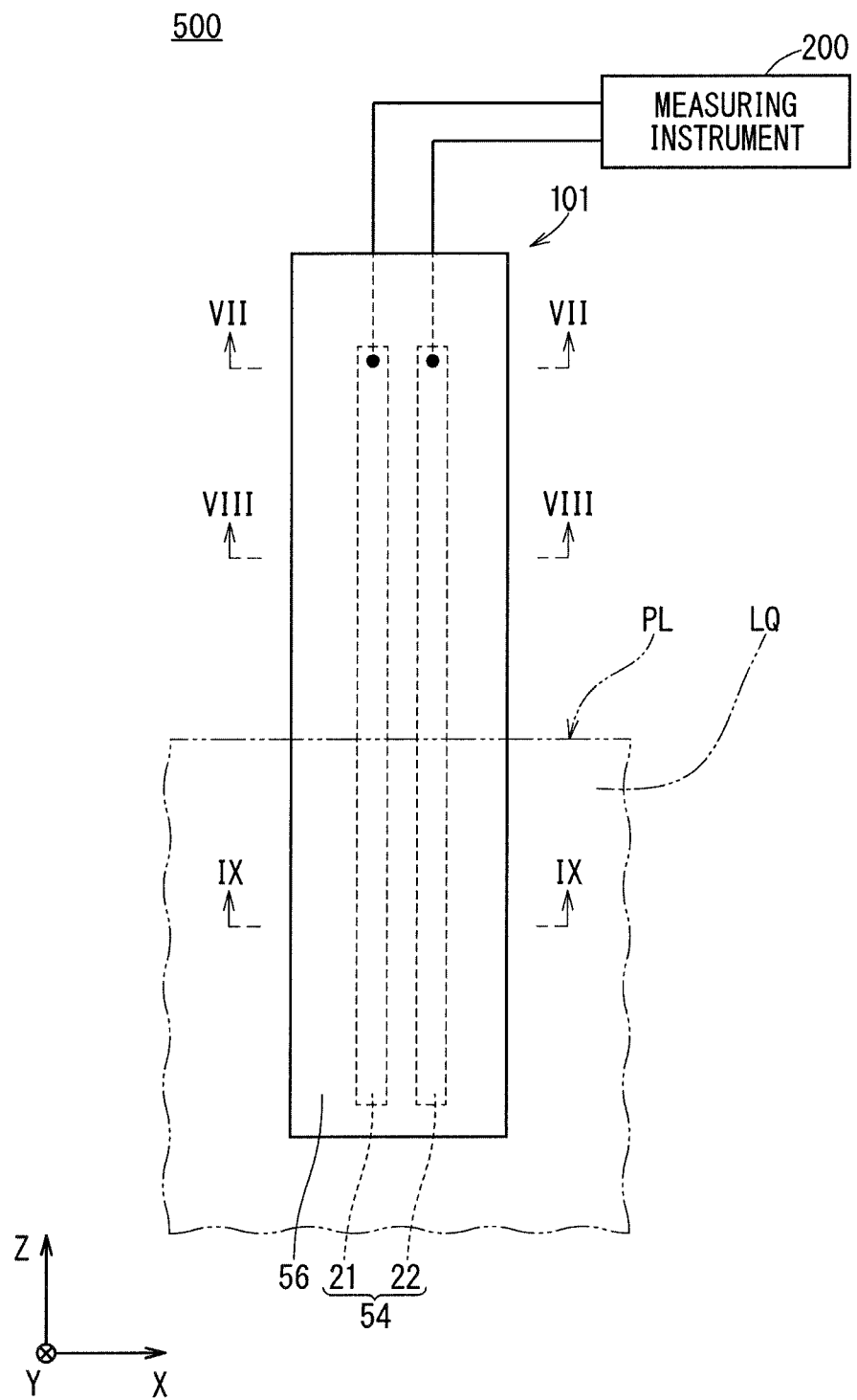
FIG. 5 is a plan view schematically illustrating a structure of a detection system including a capacitive sensor according to Embodiment 2.
Figure 6:
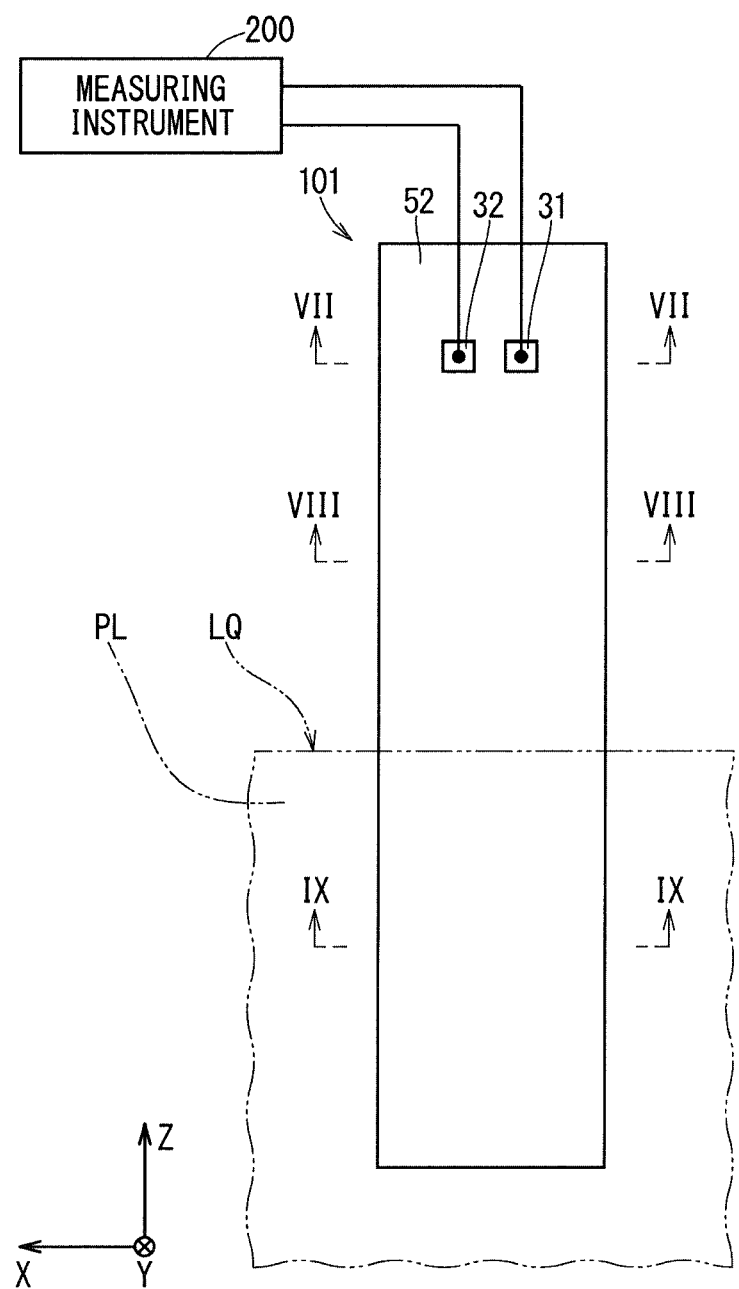
FIG. 6 is a schematic rear view of FIG. 5.
Figure 7:
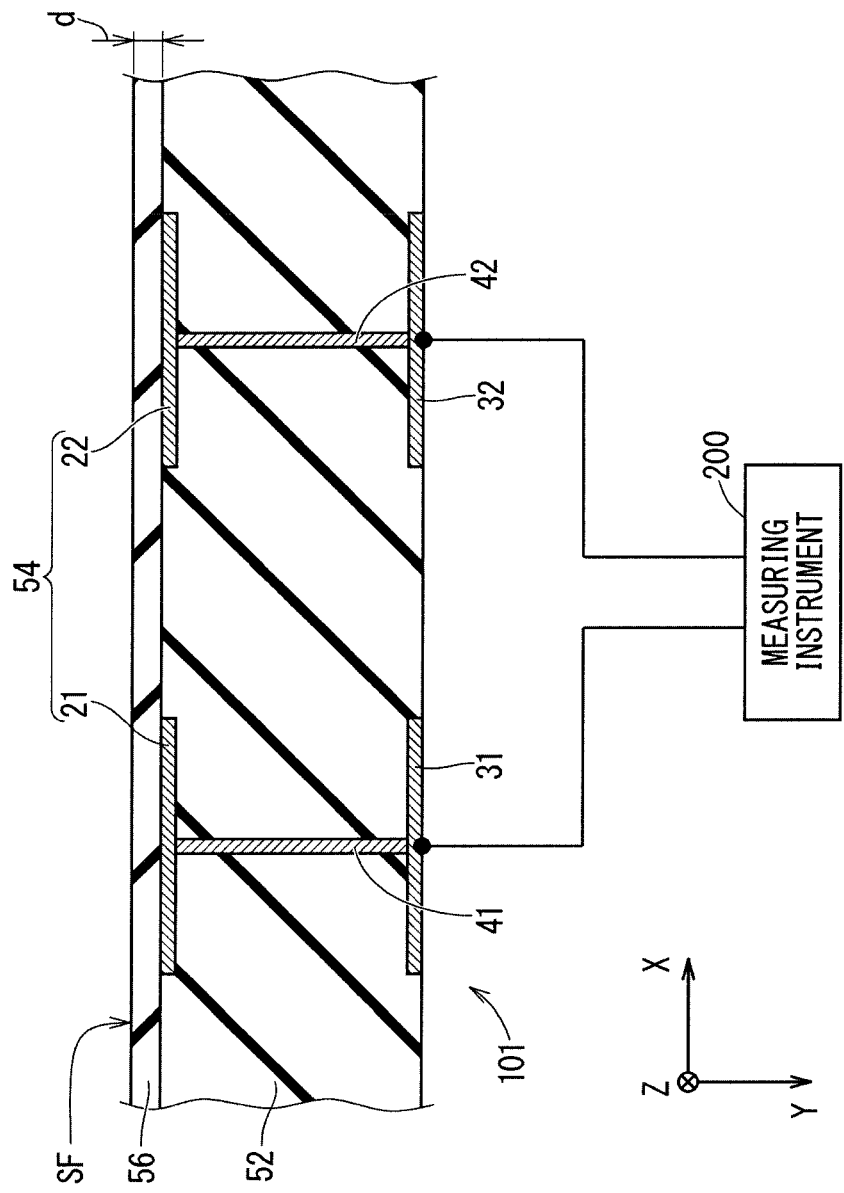
FIG. 7 is a schematic partial cross section taken along the line VII-VII in FIGS. 5 and 6.
Figure 8:
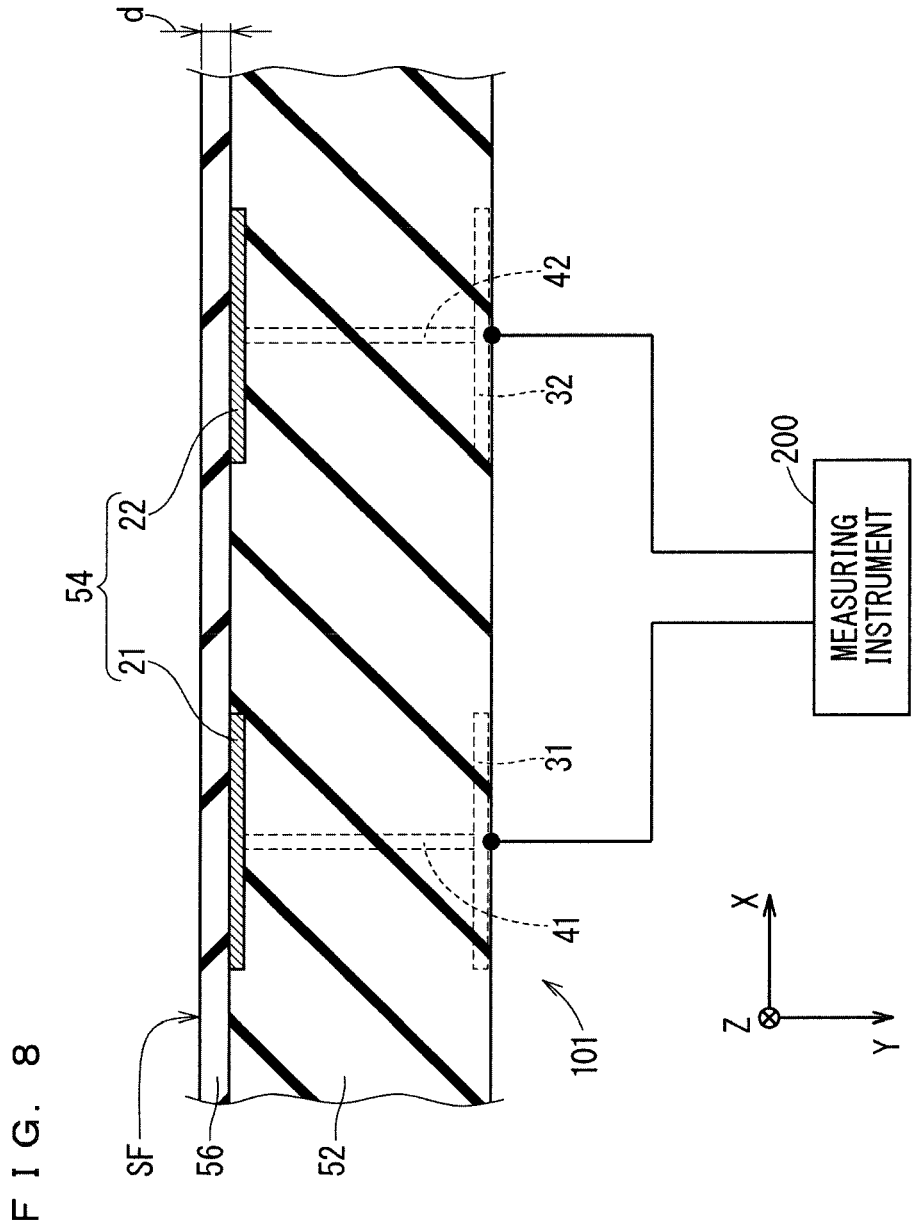
FIG. 8 is a schematic partial cross section taken along the line VIII-VIII in FIGS. 5 and 6.
Figure 9:
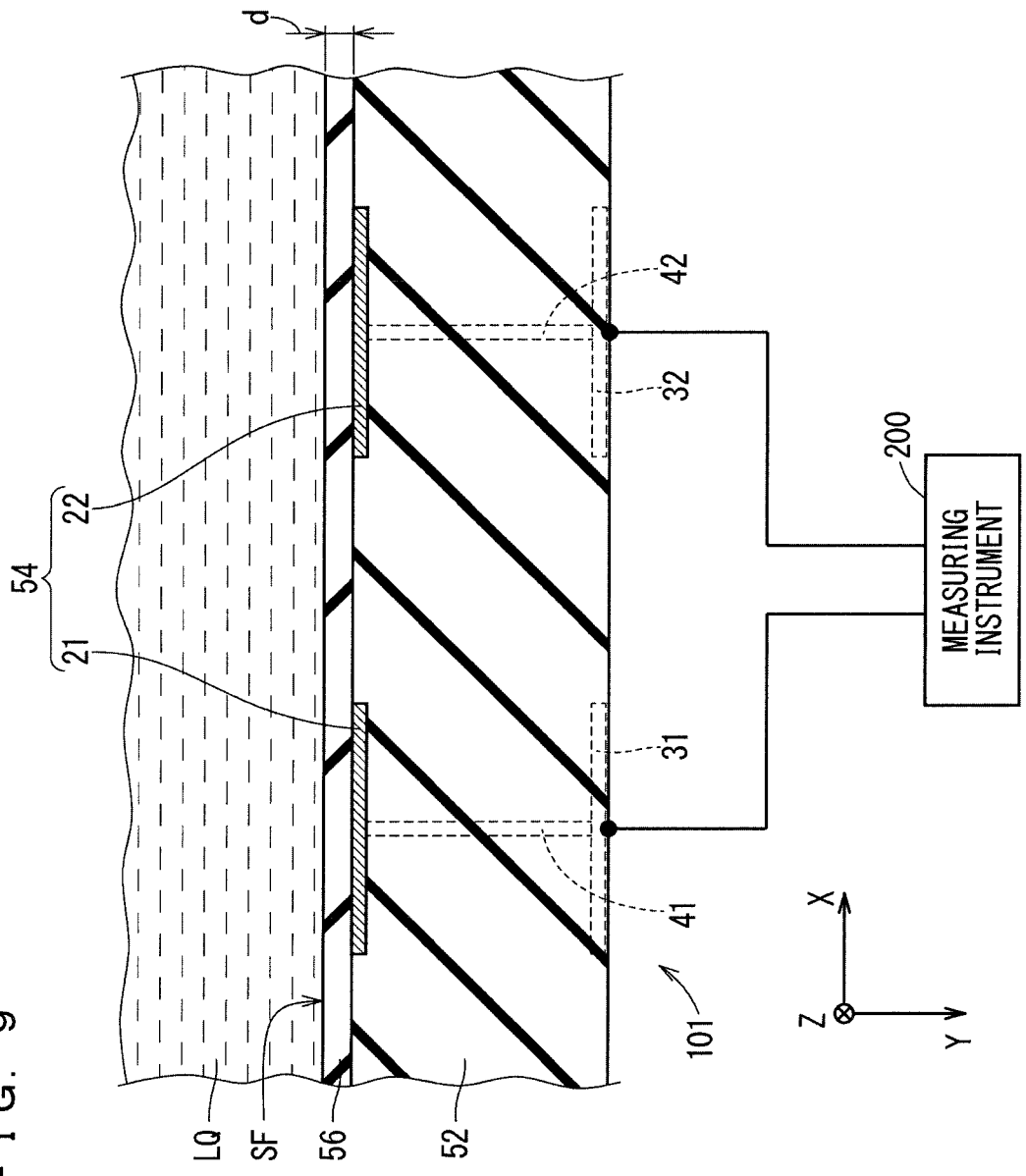
FIG. 9 is a schematic partial cross section taken along the line IX-IX in FIGS. 5 and 6.

FIG. 5 and FIG. 6 are a plan view and a rear view, respectively, each schematically illustrating a structure of a detection system 500 including a capacitive sensor 101 (an electrode embedded ceramic structure) according to Embodiment 2. FIG. 7 is a schematic partial cross section taken along the line VII-VII in FIGS. 5 and 6. FIG. 8 is a schematic partial cross section taken along the line VIII-VIII in FIGS. 5 and 6. FIG. 9 is a schematic partial cross section taken along the line IX-IX in FIGS. 5 and 6. The detection system 500 is a system that detects liquid, specifically, a system that detects a liquid level. Thus, the capacitive sensor 101 is a liquid sensor, specifically, a liquid level sensor. FIGS. 5 and 6 illustrate an example liquid level PL of liquid LQ to be detected by the capacitive sensor 101, using virtual lines. FIG. 9 also illustrates the liquid LQ. An XYZ rectangular coordinate system is illustrated to facilitate viewing of the drawings. In Embodiment 2, the direction Z is equal to a vertical upward direction. The origin in the direction Z corresponds to a zero position of the liquid level PL.

The detection system 500 includes the capacitive sensor 101 and a measuring instrument 200. The capacitive sensor 101 is a capacitive sensor for detection using change in the capacitance. The capacitive sensor 101 includes: an insulating layer 52 (the first ceramic layer in Embodiment 2), an electrode layer 54, and a protective layer 56 (the second ceramic layer in Embodiment 2). The description of the first ceramic layer, the electrode layer, and the second ceramic layer in Embodiment 1 apply to those in Embodiment 2. The electrode layer 54 includes a first sensing electrode 21 and a second sensing electrode 22. The capacitive sensor 101 may further include a first pad electrode 31, a second pad electrode 32, a first via electrode 41, and a second via electrode 42.

The insulating layer 52 is preferably made of a ceramic insulator, and is preferably made of the same material as that of the protective layer 56. The insulating layer 52 is, for example, approximately 1 mm thick.

As illustrated in FIGS. 7 to 9, the first sensing electrode 21 is formed on one surface of the insulating layer 52. The second sensing electrode 22 is formed apart from the first sensing electrode 21 on the insulating layer 52. The second sensing electrode 22 forms the capacitance with the first sensing electrode 21. As illustrated in FIG. 5, the first sensing electrode 21 and the second sensing electrode 22 may form a line and space pattern. The first sensing electrode 21 and the second sensing electrode 22 are preferably made of a high-melting metal that is hardly oxidized, for example, platinum, tungsten, or cobalt. Each of the first sensing electrode 21 and the second sensing electrode 22 is, for example, approximately 5 μm thick.

The protective layer 56 covers the first sensing electrode 21 and the second sensing electrode 22. Specifically, the protective layer 56 has a surface SF, and a surface opposite to the surface SF and facing the first sensing electrode 21 and the second sensing electrode 22. The protective layer 56 has a thickness d satisfying 1 μm≤d≤10 μm, preferably, the thickness d satisfying 1 μm≤d≤5 nm. The protective layer 56 is made of zirconia or alumina, preferably made of zirconia. The protective layer 56 has a dielectric constant ε, and preferably satisfies ε≥10. For example, ε in the protective layer 56 made of zirconia can be approximately 30, and E in the protective layer 56 made of alumina can be approximately 10. Preferably, ε/d≥1 is satisfied.

The first pad electrode 31 is formed on a surface of the insulating layer 52 opposite to the aforementioned one surface. The second pad electrode 32 is formed apart from the first pad electrode 31 on the surface of the insulating layer 52 opposite to the aforementioned one surface. The first via electrode 41 penetrates the insulating layer 52, and has one end connected to the first sensing electrode 21, and the other end connected to the first pad electrode 31. The second via electrode 42 penetrates the insulating layer 52, and has one end connected to the second sensing electrode 22, and the other end connected to the second pad electrode 32.

The measuring instrument 200 has a function of measuring the capacitance. The measuring instrument 200 is electrically connected to the first pad electrode 31 and the second pad electrode 32. This enables the measuring instrument 200 to measure the capacitance formed by the first sensing electrode 21 and the second sensing electrode 22.

A plurality of steps below are performed in a liquid detection method performed by the capacitive sensor 101. First, a step of detecting the capacitance of the capacitive sensor 101 is performed. Next, a step of detecting the liquid LQ, specifically, a step of detecting the liquid level PL of the liquid LQ is performed, based on the capacitance detected in the step of detecting the capacitance.

FIG. 10 is a circuit diagram illustrating an approximate equivalent circuit corresponding to FIG. 9. With reference to FIGS. 9 and 10, a structure in which the liquid LQ faces the first sensing electrode 21 through the protective layer 56 forms a capacitance C1. Similarly, a structure in which the liquid LQ faces the second sensing electrode 22 through the protective layer 56 forms a capacitance C2. A capacitance C measured by the measuring instrument is approximately equivalent to a capacitance of a series connection of the capacitance C1 and the capacitance C2. Thus, the capacitance C is calculated as follows:

$$C = C1 \times C2/(C1 + C2).$$

As illustrated in FIG. 5, when the second sensing electrode 22 has the same structure as that of the first sensing electrode 21, C2=C1. In this case, the above equation is rewritten to:

$$C = C1/2.$$

As illustrated in FIG. 10, a measurement value of the capacitance C is approximately proportional to the liquid level PL. Thus, understanding of a relationship between the liquid level PL and the measurement value of the capacitance C in advance enables detection of the liquid level using the measurement value of the capacitive sensor 101.

Here, the capacitance C is approximated by the capacitance formed through the protective layer 56. Thus, the capacitance C is approximately proportional to the product of the dielectric constant and the thickness of the protective layer 56, that is, ε/d. For detecting a rate of change in the capacitance C with high precision, the capacitance C is preferably larger to some extent. Thus, ε/d is preferably larger to some extent.

Specifically, ε/d≥1 is preferably satisfied.

[Summary of Advantages]

Embodiment 2 can obtain the same advantages as those according to Embodiment 1.

First, when the protective layer 56 covering the first sensing electrode 21 and the second sensing electrode 22 is made of zirconia or alumina, corrosion resistance and chemical resistance of the capacitive sensor 101 are increased.

Second, the thickness d of the protective layer 56 satisfying 1≤μm≤d≤10 μm avoids a significant decrease in the sensitivity of the capacitive sensor 101 due to the formation of the protective layer 56 while ensuring the corrosion resistance and the chemical resistance.

Consequently, the detection with high sensitivity is possible while the corrosion resistance and the chemical resistance are ensured. Specifically, the liquid level can be detected with high sensitivity.

The protective layer 56 is preferably made of zirconia. Thereby, the dielectric constant s of the protective layer 56 is a high value around 30. This sufficiently avoids a decrease in the sensitivity of the capacitive sensor 101 due to the formation of the protective layer 56.

Preferably, ε/d≥1 is satisfied. This increases the capacitance per unit area formed through the protective layer 56. This sufficiently ensures the sensitivity of the capacitive sensor 101.

Both of the insulating layer 52 and the protective layer 56 are preferably made of a ceramic insulator, more preferably made of the same material. This reduces a difference in degree of shrinkage in the firing process for manufacturing the capacitive sensor 101. Even when the thickness d of the protective layer 56 is relatively small, the protective layer 56 without any pinhole can be obtained. Thus, the thickness d can be reduced while the protective layer 56 fully enhances the effects of corrosion resistance and chemical resistance.

A portion to be the protective layer 56 is preferably formed by press bonding a green sheet. Even when the thickness d of the protective layer 56 is relatively smaller than that of the portion formed by applying a ceramic paste, the protective layer 56 without any pinhole can be obtained.

The first sensing electrode 21 and the second sensing electrode 22 are preferably made of a high-melting metal, for example, platinum, tungsten, or cobalt. This can avoid volatilization or melting of an electrode in the firing process for manufacturing the capacitive sensor 101.

Embodiment 3

Figure 11:
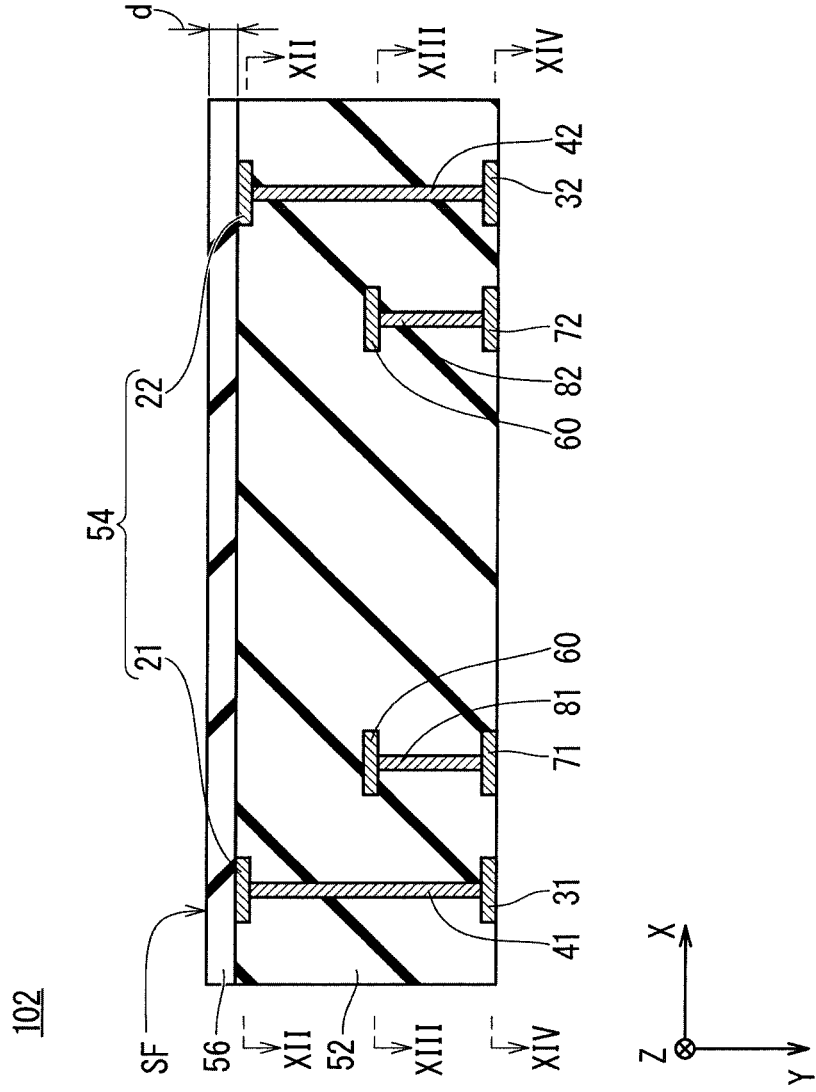
FIG. 11 is a cross section schematically illustrating a structure of a capacitive sensor according to Embodiment 3.
Figure 12:
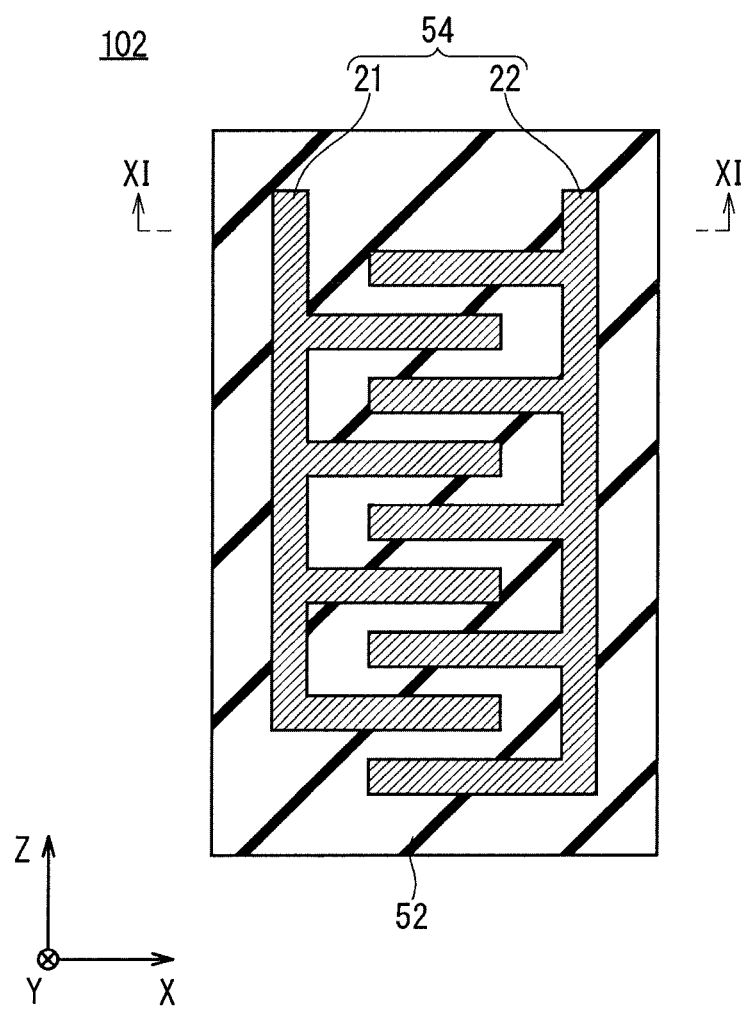
FIG. 12 is a schematic partial cross section taken along the line XII-XII in FIG. 11.
Figure 13:
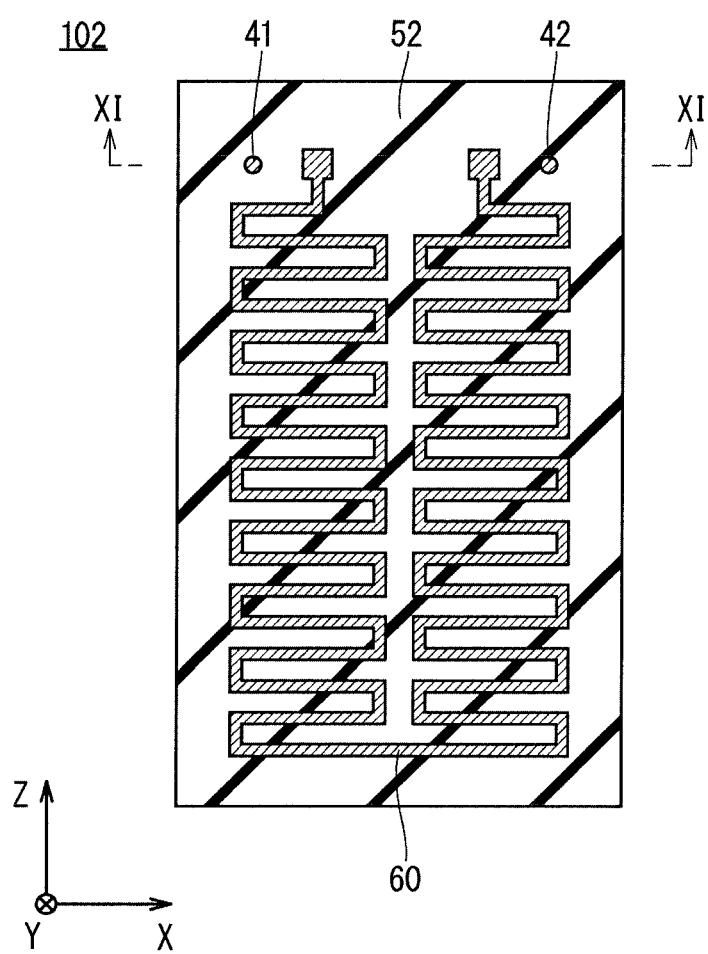
FIG. 13 is a schematic partial cross section taken along the line XIII-XIII in FIG. 11.
Figure 14:
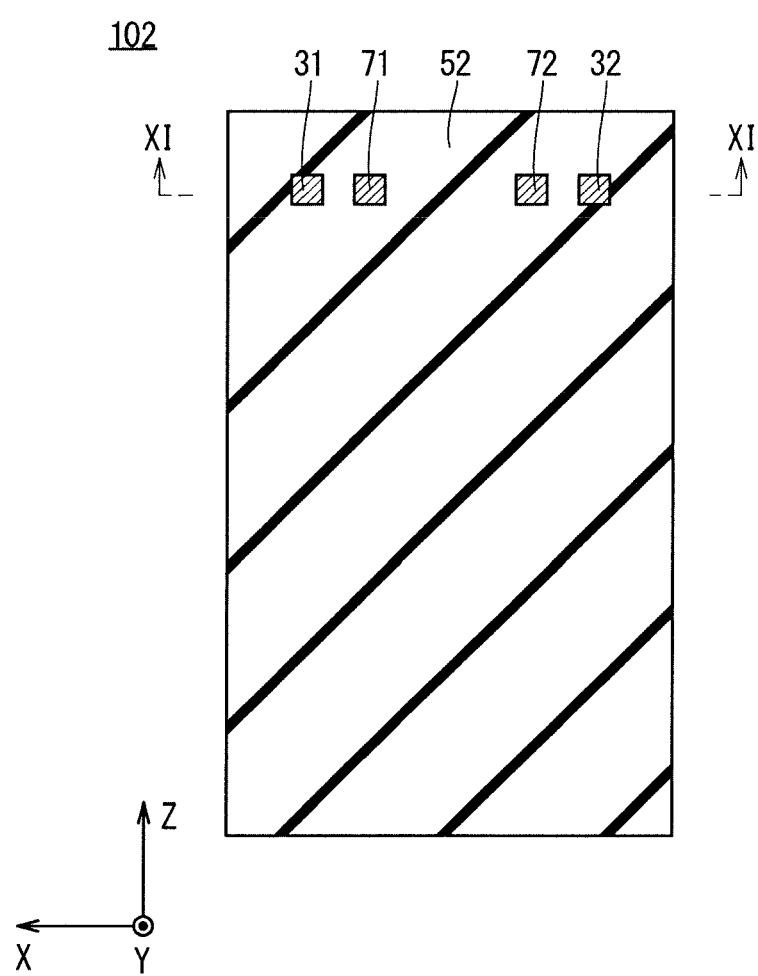
FIG. 14 is a schematic partial cross section taken along the line XIV-XIV in FIG. 11.

FIG. 11 is a cross section schematically illustrating a structure of a capacitive sensor 102 (an electrode embedded ceramic structure) according to Embodiment 3. FIG. 12, FIG. 13, and FIG. 14 are schematic partial cross sections taken along the line XII-XII, the line XIII-XIII, and the line XIV-XIV in FIG. 11, respectively.

In the detection system 500 (FIGS. 5 and 6), the use of not only the capacitive sensor 101 but also the capacitive sensor 102 enables detection of condensation on the protective layer 56. Thus, the capacitive sensor 102 is a liquid sensor, specifically, a condensation sensor. The first sensing electrode 21 and the second sensing electrode 22 for the capacitive sensor 102 are preferably comb-shaped as illustrated in FIG. 12. This can increase the sensitivity of detecting condensation.

The capacitive sensor 102 preferably includes a heater 60 for heating the protective layer 56. Application of a current to the heater 60 generates heat. Thereby, heating the protective layer 56 can remove the liquid deposited on the surface SF through evaporation. When a large amount of liquid is deposited on the surface SF due to cleaning or a long time use, removal of the liquid using the heater 60 can immediately bring a state where condensation can be detected again.

The heater 60 is preferably embedded inside the capacitive sensor 102, more preferably embedded inside the insulating layer 52. Here, the capacitive sensor 102 may include pad electrodes 71 and 72 and via electrodes 81 and 82 to enable an electrical connection to the heater 60. One end of the via electrode 81 (an upper end in FIG. 11) and one end of the via electrode 82 (an upper end in FIG. 11) are connected to one end and the other end of the heater 60, respectively. The other end of the via electrode 81 (a lower end in FIG. 11) and the other end of the via electrode 82 (a lower end in FIG. 11) are connected to the pad electrode 71 and the pad electrode 72, respectively. This structure enables the heater 60 to generate heat with application of a voltage between the pad electrodes 71 and 72.

The heater 60 and the structure related to the heater 60 may be applied to other capacitive sensors including the capacitive sensor 101 (Embodiment 2).

Since the structures other than above are almost the same as those of the capacitive sensor 101 (Embodiment 2), the same or corresponding constituent elements are denoted by the same reference numerals and the description thereof will not be repeated.

Embodiment 3 enables detection of condensation with high sensitivity while ensuring the corrosion resistance and the chemical resistance. The preferable structure of the protective layer 56 in Embodiment 3 is almost the same as that of Embodiment 2.

The heater 60 can remove the liquid deposited on the surface SF of the protective layer 56 through heating. This can immediately ensure the sensitivity for newly detecting liquid.

Embodiment 4

Figure 15:
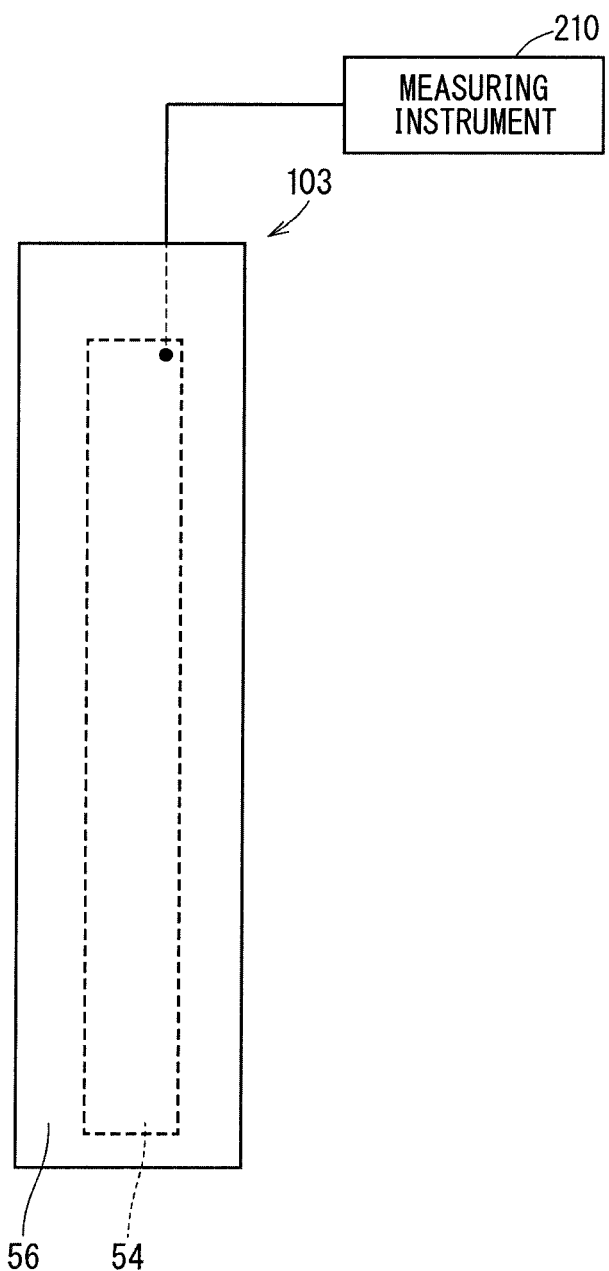
FIG. 15 is a plan view schematically illustrating a structure of a detection system including a surface potential sensor according to Embodiment 4.

FIG. 15 is a plan view schematically illustrating a structure of a detection system 510 including a surface potential sensor 103 (an electrode embedded ceramic structure) according to Embodiment 4. When provided in a device using plasma, the detection system 510 is a system that detects plasma anomalies. Specifically, the detection system 510 is a system that detects a transient current generated by change in surface charge caused by the plasma anomalies. Thus, the surface potential sensor 103 is a plasma state sensor, specifically, a plasma anomaly sensor.

The detection system 510 includes the surface potential sensor 103 and a measuring instrument 210. The capacitive sensor 101 (FIG. 5: Embodiment 2) includes a plurality of electrodes (specifically, the first sensing electrode 21 and the second sensing electrode 22) as the electrode layer 54. In contrast, the surface potential sensor 103 includes at least one sensing electrode as the electrode layer 54, only a single sensing electrode in the example illustrated in FIG. 15. The measuring instrument 210 is electrically connected to this single sensing electrode. For example, a pad electrode and a via electrode similar to the first pad electrode 31 and the first via electrode 41 (FIG. 8: Embodiment 2) may be provided for this connection. Furthermore, the surface potential sensor 103 includes the insulating layer 52 and the protective layer 56 (see FIG. 8) similar to the capacitive sensor 101. The surface potential sensor 103 is a surface potential sensor using change in surface potential of the protective layer 56.

Plasma anomalies in a location with the surface potential sensor 103 cause transient electric charging on the protective layer 56. This induces charges with an opposite sign to the electrode layer 54. The measuring instrument 210 measures the induced transient electric charges. For example, when the voltage generated by the charges is higher than a threshold value, the occurrence of a plasma anomaly is determined. Thus, the surface potential sensor 103 is an electrical probe for measuring plasma.

Embodiment 5

Figure 16:
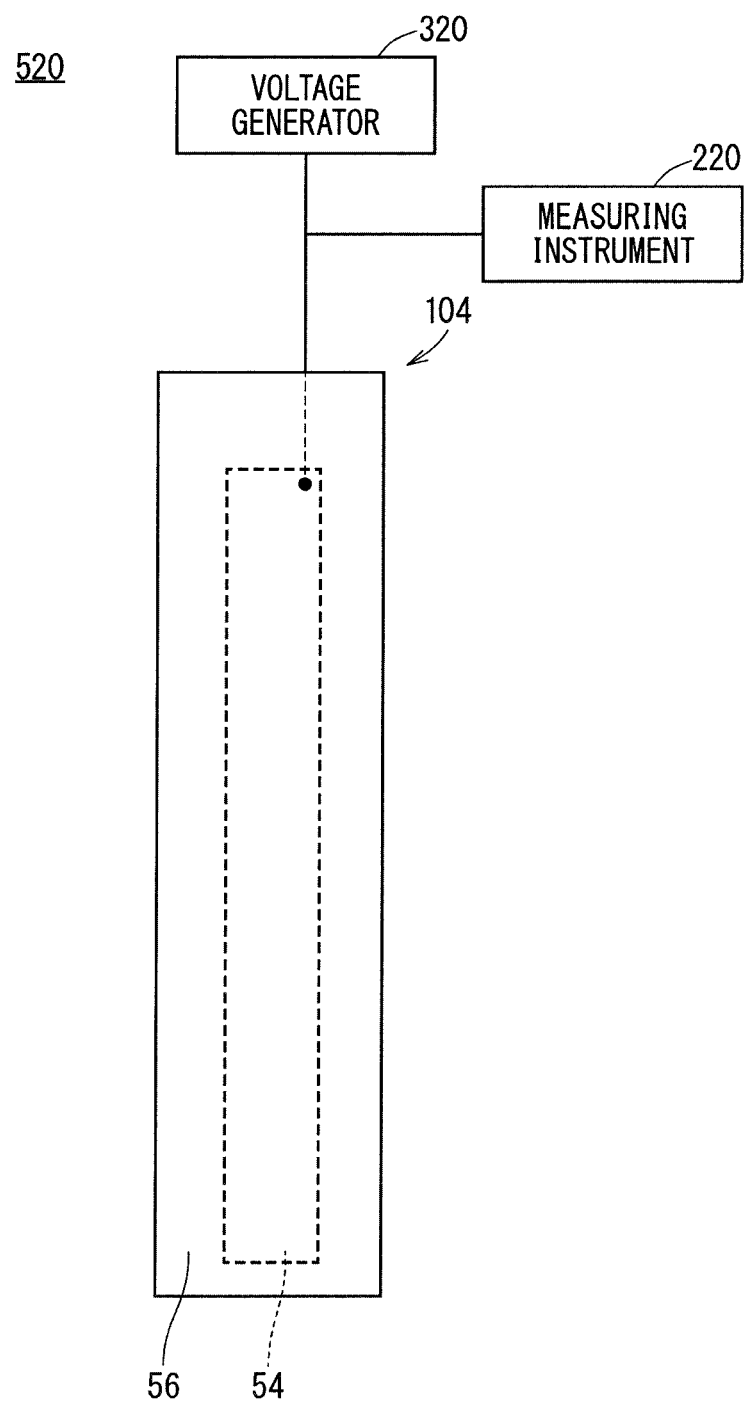
FIG. 16 is a plan view schematically illustrating a structure of a detection system including a surface potential sensor according to Embodiment 5.

FIG. 16 is a plan view schematically illustrating a structure of a detection system 520 including a surface potential sensor 104 (an electrode embedded ceramic structure) according to Embodiment 5. The detection system 520 includes the surface potential sensor 104, a measuring instrument 220, and a voltage generator 320. The structure of the surface potential sensor 104 may be the same as that of the surface potential sensor 103 (FIG. 15: Embodiment 4). The surface potential sensor 104 is also a surface potential sensor using change in surface potential of the protective layer 56 (see FIG. 8), similarly to the surface potential sensor 103. When provided in a device using plasma, the detection system 520 is a system that detects change in surface potential of plasma. Specifically, the detection system 520 is a system that detects change in surface potential of plasma from voltage-current characteristics in the surface potential sensor 104. The voltage generator 320 controls the voltage in measuring the voltage-current characteristics. The measuring instrument 220 measures the current characteristics. Thus, the surface potential sensor 104 is an electrical probe for measuring plasma.

The specific examples of the present invention are described in details above. These are mere exemplifications, and do not restrict the claims. The technology described in the claims includes various modifications and alterations to the exemplified specific examples. The single use or various combinations of the technological elements described in this specification or the drawings bring the technological usability. The technological elements are not restricted by the combinations in the claims as originally filed. The technology exemplified in this specification or the drawings can achieve a plurality of objects. Achieving one of the objects brings the technological usability.

What is claimed is:

1. A sensor having an exposed detection surface, comprising:
   a first ceramic layer;
   an electrode layer formed on a surface of the first ceramic layer; and
   a second ceramic layer having a surface as the exposed detection surface, covering the first ceramic layer and the electrode layer, the second ceramic layer being thinner than the first ceramic layer and having a thickness from 1 μm to 10 μm as a single layer between the detection surface and the electrode layer, the electrode layer being disposed directly between the first ceramic layer and the second ceramic layer,
   wherein in a cross section of the first ceramic layer, the electrode layer, and the second ceramic layer along a laminating direction, T1 and T2 satisfy Equation (1) below, where T1 denotes a least thickness in the second ceramic layer on the electrode on the first ceramic layer, and T2 denotes an average thickness of the second ceramic layer on the electrode on the first ceramic layer:

$$(T2 - T1)/T2 \leq 0.15. \tag{1}$$

2. The sensor according to claim 1,
   wherein a percentage of voids in the second ceramic layer is less than or equal to 0.05%.

3. The sensor according to claim 1,
   wherein in the cross section, L1, L2, and L3 satisfy Equation (2) below, where L1 denotes a length of the electrode layer on the first ceramic layer, L2 denotes a length of the electrode layer on the second ceramic layer, and L3 denotes a length of the electrode layer in a direction orthogonal to the laminating direction:

$$(L1 + L2)/L3 \geq 2.2. \tag{2}$$

4. The sensor according to claim 3,
   wherein the length L1 is larger than the length L2.

5. The sensor according to claim 1,
   wherein the electrode layer contains ceramic particles, and
   a percentage of the ceramic particles in the electrode layer is higher than or equal to 4%.

6. The sensor according to claim 1,
   wherein the sensor is a capacitive sensor.

7. The sensor according to claim 1,
   wherein sensor is a surface potential sensor.

* * * * *